US008412002B2

(12) United States Patent
Peng et al.

(10) Patent No.: US 8,412,002 B2
(45) Date of Patent: Apr. 2, 2013

(54) METHOD FOR GENERATING ALL-IN-FOCUS IMAGE

(75) Inventors: Shih-Yuan Peng, New Taipei (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 33 days.

(21) Appl. No.: 13/237,958

(22) Filed: Sep. 21, 2011

(65) Prior Publication Data

US 2012/0301025 A1    Nov. 29, 2012

(30) Foreign Application Priority Data

May 24, 2011    (TW) .............................. 100118146 A

(51) Int. Cl.
G06K 9/32    (2006.01)
G06K 9/48    (2006.01)

(52) U.S. Cl. ....................................... 382/299; 382/199

(58) Field of Classification Search .................. 382/154, 382/275, 285, 298–300, 305; 345/419–427, 345/700

See application file for complete search history.

(56) References Cited

U.S. PATENT DOCUMENTS

| | | | | |
|---|---|---|---|---|
| 5,825,930 | A * | 10/1998 | Park et al. .................... | 382/236 |
| 7,477,802 | B2 * | 1/2009 | Milanfar et al. .............. | 382/299 |
| 7,613,363 | B2 * | 11/2009 | Platt et al. .................... | 382/299 |
| 8,073,277 | B2 * | 12/2011 | Huan et al. .................... | 382/254 |
| 8,254,726 | B2 * | 8/2012 | Ichihashi et al. ............. | 382/300 |
| 2008/0175519 | A1 * | 7/2008 | Nagumo ........................ | 382/299 |
| 2008/0186390 | A1 * | 8/2008 | Sato et al. .................... | 348/222.1 |
| 2009/0092337 | A1 * | 4/2009 | Nagumo ........................ | 382/299 |
| 2009/0304266 | A1 * | 12/2009 | Aoki et al. .................... | 382/154 |
| 2010/0014709 | A1 * | 1/2010 | Wheeler et al. .............. | 382/103 |
| 2010/0119176 | A1 * | 5/2010 | Ichihashi et al. ............. | 382/300 |

OTHER PUBLICATIONS

Prabhudesai, A.; Bopardikar, A.; Reddy, C.S.; , "Selecting High Quality Frames for Super Resolution Reconstruction Using Perceptual Quality Metrics," Image and Video Technology (PSIVT), 2010 Fourth Pacific-Rim Symposium on , vol., no., pp. 393-398, Nov. 14-17, 2010.*
Li et al "Super-Resolution for Synthetic Zooming", Hindawi Publishing Corporation EURASIP Journal on Applied Signal Processing vol. 2006, Article ID 58195, pp. 1-12.*
Callicó et al, Analysis of Fast Block Matching Motion Estimation Algorithms for Video Super-Resolution Systems, IEEE Transactions on Consumer Electronics, vol. 54, No. 3, Aug. 2008.*

* cited by examiner

*Primary Examiner* — Andrae S Allison
(74) *Attorney, Agent, or Firm* — Jianq Chyun IP Office

(57) ABSTRACT

A method for generating an all-in-focus image is provided. In the method, a plurality of frames including one source frame and several reference frames captured at different focus lengths are obtained. After performing a motion compensation procedure on the frames, for each pixel position belonging to an edge, a characteristic similarity between the source frame and each reference frame is calculated respectively to accordingly select a plurality of qualified reference frames among the reference frames. The method further includes determining a first type color space component of the pixel position within an all-in-focus image by an edge sharpness corresponding to the pixel position within each of the source frame and the qualified reference frames, and determining a second type color space component of the pixel position within the all-in-focus image by an color brightness corresponding to the pixel position within each of the source frame and the qualified reference frames.

10 Claims, 4 Drawing Sheets

| (i−1,j−1) | (i,j−1) | (i+1,j−1) |
| --- | --- | --- |
| (i−1,j) | (i,j) | (i+1,j) |
| (i−1,j+1) | (i,j+1) | (i+1,j+1) |

Initial value of the brightness component

| -1 | 0  | -1 | 0  | -1 |
|----|----|----|----|----|
| 0  | -1 | -1 | -1 | 0  |
| -1 | -1 | 16 | -1 | -1 |
| 0  | -1 | -1 | -1 | 0  |
| -1 | 0  | -1 | 0  | -1 |

METHOD FOR GENERATING ALL-IN-FOCUS IMAGE

CROSS-REFERENCE TO RELATED APPLICATION

This application claims the priority benefit of Taiwan application serial no. 100118146, filed on May 24, 2011. The entirety of the above-mentioned patent application is hereby incorporated by reference herein and made a part of this specification.

BACKGROUND OF THE INVENTION

1. Field of Invention

The present invention relates to an image processing method. More particularly, the present invention relates to a method for generating an all-in-focus image.

2. Description of Related Art

With the development of the technologies, the electronic products are highly popular and are widely used in many countries. The consumer electronic products even become indispensable tools to people's daily life. Taking the digital camera as an example, since there are many product brands, the market for selling the digital cameras is highly competitive. The manufacturers devote themselves to develop the cameras with more powerful functions to attract consumers' attentions.

Generally, the digital camera needs to provide not only a good image quality, but also high focus accuracy and focusing speed which are the concerning factors for the consumers while buying the electronic products. However, as for the current optical system, the depths of field of the objects in the three-dimensional scene are different from each other so that it is impossible to capture a clear all-in-focus image during a single image shooting. That is, due to the limitation of the optical properties of the lens, one of the depths of field is selected for focusing while the digital camera captures the image. Thus, the images of the objects which are not located within the selected depth of field are blurred.

The all-in-focus image re-generation is a technique developed for solving the aforementioned problem. However, the recent all-in-focus re-generation is performed without considering the information about the brightness and color. Thus, it is easy to lead to paling the colors of the generated all-in-focus image and even damage the original color performance of the edge of the object. Moreover, the noise distribution in the bright-and-dark region of the image is not uniform. Thus, it is easy that the all-in-focus generated simply by composing images fails to provide good image quality while the all-in-focus is generated without concerning the noises of the bright-and-dark region.

SUMMARY OF THE INVENTION

Accordingly, the present invention provides a method for generating an all-in-focus image to avoid the all-in-focus image generated by several frames from losing image details.

The invention provides a method for generating an all-in-focus image used in an image capturing device. In the method, a plurality of frames captured at a plurality of focal lengths are obtained, wherein the frames comprise a source frame and a plurality of reference frames. A motion compensation procedure is performed on the frames. An edge detection procedure is performed on the frames to determine whether each of pixel positions in the frames belongs to an edge. For each of the pixel positions belonging to the edge, the following steps are performed. A characteristic similarity between the pixel position within the source frame and the pixel position within each of the reference frames is calculated and, according to the characteristic similarities respectively corresponding to the reference frames, a plurality of qualified reference frames among the reference frames are selected. According to an edge sharpness corresponding to the pixel position within each of the source frame and the qualified reference frames, a first type color space component of the pixel position within an all-in-focus image is determined. According to a color brightness corresponding to the pixel position within each of the source frame and the qualified reference frames, a second type color space component of the pixel position within the all-in-focus image is determined.

According to one embodiment of the present invention, a number of the frames captured at each of the focal lengths are larger than one.

According to one embodiment of the present invention, the step of calculating the characteristic similarity between the pixel position within the source frame and the pixel position within each of the reference frames comprises, in the source frame, obtaining an n×n pixel block with the pixel position as a center, wherein n is a positive integer. For each of the reference frames, the n×n pixel block with the pixel position as a center is obtained, and a sum of absolute difference (SAD) of a specific color space component of each of pixels in the n×n pixel block of the source frame and the reference frame is calculated to be the characteristic similarity between the pixel position in the source frame and the pixel position in the reference frame.

According to one embodiment of the present invention, the specific color space component includes one of a brightness component, a blue chromaticity component and a red chromaticity component.

According to one embodiment of the present invention, the step of selecting the qualified reference frames among the reference frames according to the characteristic similarities respectively corresponding to the reference frames comprises, for each of the reference frames, detecting whether the pixel position within the reference frame has impulse noises. When there is no impulse noise, a threshold value of the specific color space component is obtained and it is determined whether the characteristic similarity between the pixel position in the source frame and the pixel position in the reference frame is smaller than the threshold value of the specific color space component. When the characteristic similarity is smaller than the threshold value of the specific color space component, the reference frame is selected as the qualified reference frame.

According to one embodiment of the present invention, the step of obtaining the threshold value of the specific color space component comprises calculating a mean absolute error (MAE) of the specific color space component of each of the pixels within the n×n pixel block in the source frame and calculating the MAE of the specific color space component of each of the pixels within the n×n pixel block in the reference frame. The MAE corresponding to the source frame is compared with the MAE corresponding to the reference frame. An initial value of the specific color space component is obtained according to one larger MAE among the MAE corresponding to the source frame and the MAE corresponding to the reference frame, and a specific color space component gain is obtained according to the specific color space component of the pixel position within the source frame. Then, a product of the initial value of the specific color space component and the specific color space component gain is regarded as the threshold value of the specific color space component.

According to one embodiment of the present invention, the step of determining the first type color space component of the pixel position within the all-in-focus image according to the edge sharpness corresponding to the pixel positions within each of the source frame and the qualified reference frames comprises: applying a Laplacian mask to calculate the edge sharpness corresponding to the pixel position within each of the source frame and the qualified reference frames. Among the source frame and the reference frames, m frames each corresponding to larger edge sharpness are obtained and an average weight value of a brightness component of the pixel position of each of m frames is calculated to be the first type color space component.

According to one embodiment of the present invention, the step of determining the second type color space component of the pixel position within the all-in-focus image according to the color brightness corresponding to the pixel position within each of the source frame and the qualified reference frames comprises: determining whether a chromaticity component of the pixel position within each of the source frame and the qualified reference frames is all close to a neutral color. When the chromaticity component of the pixel position within each of the source frame and the qualified reference frames is all close to the neutral color, a weight value corresponding to each of the source frame and the qualified reference frames is determined according to a first rule. When the chromaticity component of the pixel position within each of the source frame and the qualified reference frames is not all close to the neutral color, the weight value corresponding to each of the source frame and the qualified reference frames is determined according to a second rule. According to the weight values corresponding to each of the source frame and the qualified reference frames, an average weight value of the chromaticity component of the pixel positions within each of the source frame and the qualified reference frames is calculated to be the second type color space component.

According to one embodiment of the present invention, the first rule is that the frame of which the chromaticity component of the pixel position therein is closer to the neutral color is given a relatively large weight value and the second rule is that the frame of which the chromaticity component of the pixel position therein is more far from the neutral color is given a relatively large weight value.

According to one embodiment of the present invention, after the step of determining whether each of the pixel positions in each of the frames belongs to the edge, the method further comprises: for each of the pixel positions not belonging to the edge, using a brightness component of the pixel position in the source frame as the first type color space component of the pixel position within the all-in-focus image and using the chromaticity component of the pixel position in the source frame as the second type color space component of the pixel position within the all-in-focus image.

Accordingly, when the present invention uses several frames to generate an all-in-focus image, not only the noises in the image are eliminated at the same time, but also the details of the image, such as the color and brightness of the image, are taken into account. Thus, the quality of the generated all-in-focus image is better.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
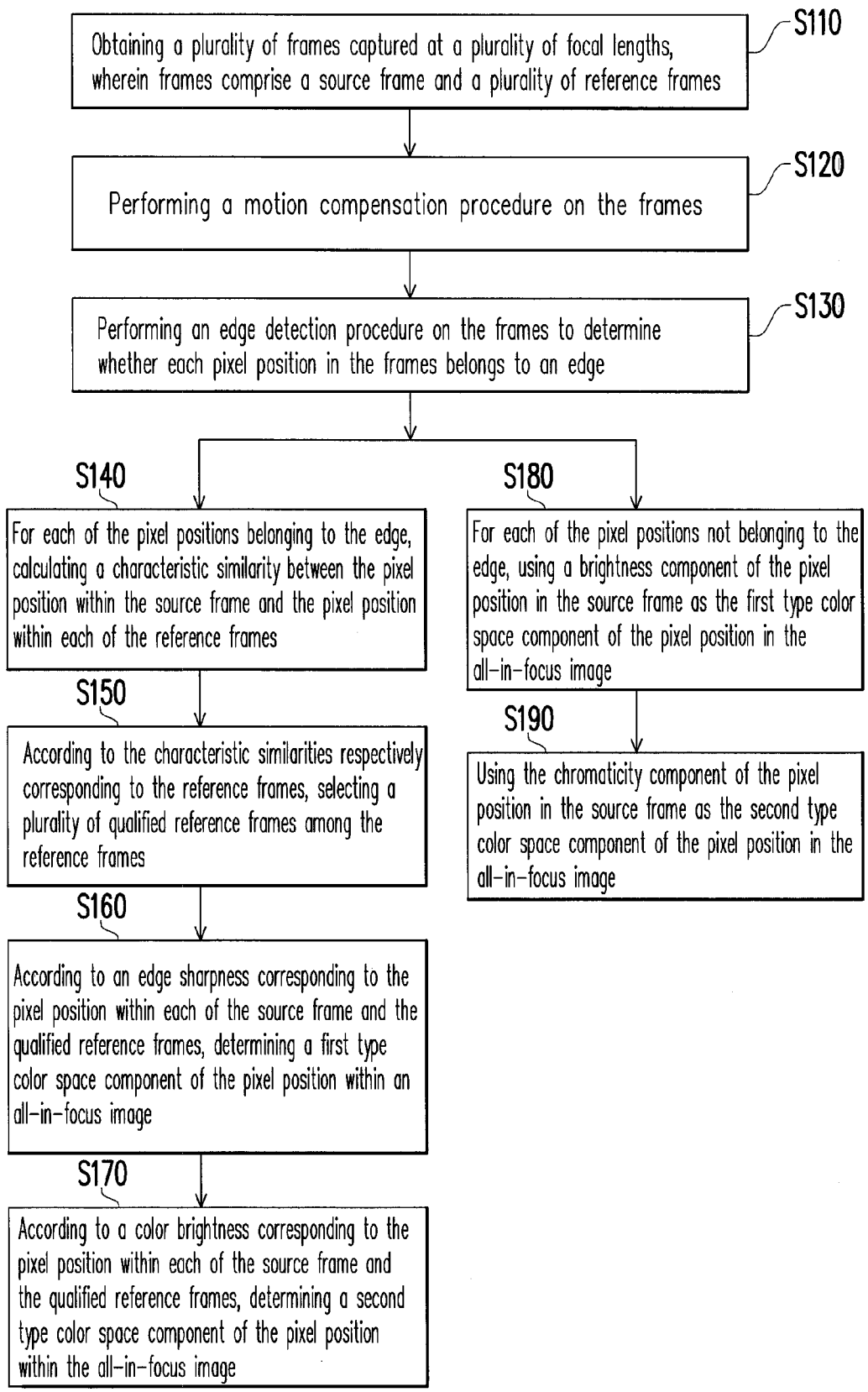
FIG. 1 is a process flow diagram, schematically illustrating a method for generating an all-in-focus image according to one preferred embodiment of the invention.

FIG. 1 is a process flow diagram, schematically illustrating a method for generating an all-in-focus image according to one preferred embodiment of the invention. The method for generating an all-in-focus image is applied on an image capturing device for generating an all-in-focus image by using the frames respectively captured at different focal lengths. The image capturing device is, for example, a camera, a camcorder, or any electronic devices possessing the image capture ability.

As shown in step S110, a plurality of frames captured at a plurality of focal lengths are obtained. The aforementioned frames comprise a source frame and a plurality of reference frames. More specifically, the image capturing device performs a focus action in advance. Thus, an optimum focal length of one object to be shot can be determined by using the auto-focusing function of the image capturing device. Then, the continuous frames captured at the focal lengths within or beyond the aforementioned optimum focal length are obtained. In the present invention, in order to eliminate the noises in the frame while the all-in-focus image is generated, at least two frames are captured at each focal length. Among the captured frames, the one which is captured at the optimum focal length is regarded as the source frame and rest of the frames are the reference frames.

Since it is possible that the position of the object in the continuous frames shifts, a motion compensation procedure is performed on the aforementioned frames so that the position of each portion of each reference frame matches the position of the corresponding portion of the source frame, as shown in step S120. In the present embodiment, the global motion vector or the local motion vector can be used to perform the motion compensation procedure. Hence, the implementation of the motion compensation procedure is not limited herein.

As shown in step S130, an edge detection procedure is performed on the aforementioned frames to determine whether each pixel position within the frames belongs to an edge. More specifically, the edge detection is performed on each frame to generate an edge map of each frame. In which, the edge map is a matrix with a size as same as the size of the frame and each element of the matrix records the information about whether the corresponding pixel position in the frame is at the edge. By comparing the edge maps of the frames with each other (such as determining the overlapping portions in each edge map), the position where the object is located in the frames can be recognized so as to determine whether each pixel position is at the edge.

In the present invention, steps S140 through S170 are performed on each pixel position belonging to the edge. As shown in step S140, for each pixel position belonging to the edge, a characteristic similarity between the pixel position within the source frame and the same pixel position within each reference frame is calculated respectively. It should be noticed that the present invention not only compares the characteristic similarity between the single pixel position in the source frame and the corresponding pixel position in each reference frame but also determines the characteristic similarity between a block region including the pixel position in the source frame and a block region including the corresponding pixel position in each reference frame.

Figures 2, 3:
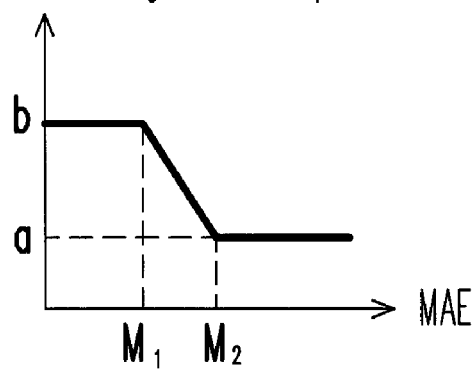
FIG. 2 is a schematic diagram showing pixel regions according to one embodiment of the present invention.
FIG. 3 is an initial value of the brightness component versus MAE graph according to one embodiment of the present invention.

To be specific, an n×n pixel block with a pixel position as a center is obtained from the source frame (wherein, n is a positive integer). It is assumed that the coordinate of the pixel position is (i,j) and n is 3, and the 3×3 pixel block obtained in the present embodiment is shown in FIG. 2, wherein the 3×3 pixel block includes nine pixel positions. Similarly, for each of the reference frames, an n×n pixel block with the pixel position as a center is obtained from the reference frame. Then, a sum of absolute difference (SAD) of a specific color space component of each pixel in each of the n×n pixel blocks respectively obtained from the source frame and the reference frame is calculated. The SAD can reflect whether the characteristic of the n×n pixel block in the source frame is similar to the characteristic of the n×n pixel block in the reference frame. Accordingly, for each of the reference frames, the corresponding SAD is regarded as the characteristic similarity between the pixel position in the reference frame and the corresponding pixel position in the source frame.

In the present embodiment, the SAD between the pixel position in the source frame and the corresponding pixel position in each reference frame can be calculated, for example, according to the following equation:

$$SAD = \sum_{p=1}^{n \times n} \text{abs}(SC\_S_p - SC\_R_p)$$

Wherein, SC_Sp represents a specific color space component of a pixel in the n×n pixel block in the source frame, and SC_Rp represents a specific color space component of a pixel in the n×n pixel block in the reference frame.

As for each of the pixel positions belonging to the edge, the present embodiment uses the image congruence method to generate an all-in-focus image and to eliminate noises at the same time. Further, due to possible changes in light color and brightness during the procedure of continuously capturing the frames and in order to avoid the result of the motion compensation procedure from being not accurate enough, it is necessary to consider the characteristic similarity between the source frame and each reference frame in the image congruence method to select more adequate reference frames to be used in the image congruence method. Hence, as shown in step S150, according to the characteristic similarities respectively corresponding to the reference frames, a plurality of qualified reference frames are selected from the aforementioned reference frames.

The method for selecting the qualified reference frames is depicted in following description. A detection of impulse noise is performed on each of the reference frames to determine whether the pixel position within each reference frame has impulse noises. If an impulse noise happens on the pixel position, the reference frame having the pixel position with the impulse noise is screened out to avoid the result of the image congruence method from having poor quality.

For each of the reference frames without having impulse noise on the pixel position, a threshold value of the specific color space component is obtained and it is determined whether the characteristic similarity between the pixel position in the source frame and the corresponding pixel position in the reference frame is smaller than the threshold value of the specific color space component. If the characteristic similarity between the pixel position in the source frame and the corresponding pixel position in the reference frame is smaller than the threshold value of the specific color space component, it means that the source frame and the reference frame on this pixel position have analogous character. Hence, the reference frame is selected to be the qualified reference frame.

It should be noticed that the threshold value of the specific color space component is dynamically obtained. That is, according to the specific color space components of the pixels in the source frame and the reference frame, the adequate threshold value of the specific color space component is obtained. More specifically, the mean absolute error (MAE) of the specific color space component of each of the pixels in the n×n pixel block in the source frame is calculated according to the following equation:

$$MAE = \frac{1}{n \times n} \sum_{q=1}^{n \times n} \text{abs}(SC\_S_q - \overline{SC\_S})$$

Wherein, SC_Sq represents the specific color space component of a pixel in the n×n pixel block in the source frame, and $\overline{SC\_S}$ represents the mean of the specific color space component of all pixels in the n×n pixel block.

After the MAE of the specific color space component of each pixel in the n×n pixel block in each of the reference frames is calculated by using the equation analogous to the aforementioned equation, the MAE corresponding to the source frame is compared with the MAE corresponding to each of the reference frames. An initial value of the specific color space component is obtained according to the larger MAE among the MAE corresponding to the source frame and the MAE corresponding to the reference frame. Moreover, according to the specific color space component of the pixel position within the source frame, a specific color space component gain is obtained. Thereafter, the product of the initial value of the specific color space component and the specific color space component gain is used as the threshold value of the specific color space component.

In the YCbCr color space, the specific color space component comprises the brightness component, blue chromaticity component and red chromaticity component. However, the present invention is not limited to the color space. Taking the brightness component as an example, FIG. 3 is an initial value of the brightness component versus MAE graph according to one embodiment of the present invention. In the present embodiment, the initial values a and b of the brightness component and MAEs M1 and M2 are the predetermined so that, by using interpolation method, the relationship curve shown in FIG. 3 can be obtained. As shown in FIG. 3, the smaller MAE (such as the one smaller than M1) represents a relatively blurred edge in image character so that it is better to loose the restriction of the congruence to enhance the congruent probability and to further eliminate the image noises as possible. Thus, after the MAE of the brightness component of each pixel in the n×n pixel block in each of the source frame and the reference frame are calculated respectively, and the relatively large MAE among the MAE corresponding to the source frame and the MAE corresponding to the reference frame is obtained, and the initial value of the brightness component is determined to be the larger initial value b if the obtained MAE is smaller than M1. Alternatively, the larger MAE (such as the one larger than M2) means a hard edge in the image character and ghost image easily happens while the image congruence is improperly performed on the hard edge. Thus, while the relatively large MAE among the MAE corresponding to the source frame and the MAE corresponding to the reference frame is larger than M2, the corresponding initial value of the brightness component is the initial value a to decrease the probability for performing time congruence. Further, the obtained MAEs between M1 and M2 linearly correspond to the initial values of the brightness component between a and b.

Figures 4, 5:
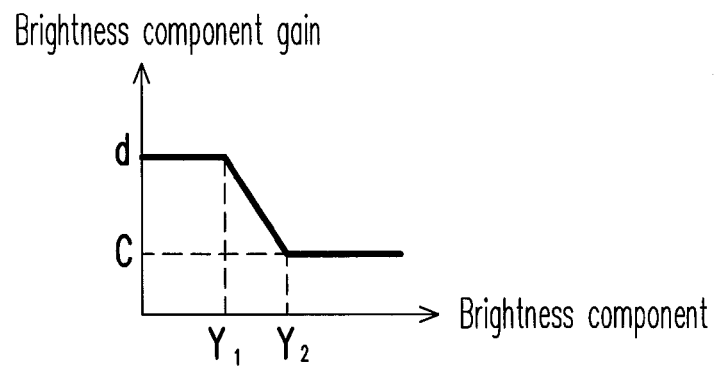
FIG. 4 is a brightness component gain versus brightness component graph according to one embodiment of the present invention.
FIG. 5 is a schematic diagram showing a Laplacian mask according to one embodiment of the present invention.

FIG. 4 is a brightness component gain versus brightness component graph according to one embodiment of the present invention. In the present embodiment, the brightness component grains c and d and the brightness components Y1 and Y2 are predetermined so that, by using interpolation method, the relationship curve shown in FIG. 4 can be obtained. As shown in FIG. 4, the smaller brightness component (such as the one smaller than Y1) represents a relatively low brightness. It should be noticed that the dark portion of the image possesses more noise. In order to eliminate the noises as possible, the relatively large brightness component gain d is obtained to enhance the probability for performing the congruence when the brightness component of the pixel position in the source frame is smaller than Y1. Alternatively, the larger brightness component (such as the one larger than Y2) represents a relatively high brightness. Thus, the relatively small brightness component gain c is obtained to decrease the probability for performing the congruence. When the brightness component of the pixel position in the source frame is between Y1 and Y2 and the corresponding brightness component grain is between c and d.

After the initial value of the brightness component and the brightness component gain are obtained by using FIG. 3 and FIG. 4, the product of the initial value of the brightness component and the brightness component gain is regarded as the threshold value of the brightness component (i.e., the specific color space component).

The threshold value of each of other specific color space components (such as blue chromaticity component or read chromaticity component) can be obtained by applying the similar method. Taking the threshold value of the blue chromaticity component as an example, the MAE of the blue chromaticity component of each pixel in the n×n pixel block in the source frame and the MAE of the blue chromaticity component of each pixel in the n×n pixel block in the reference frame are calculated and then, according to the larger MAE among the MAEs corresponding to the source frame and the reference frame, an initial value of the blue chromaticity component is obtained and regarded as the threshold value of the blue chromaticity component. When the threshold value of the red chromaticity component is calculated, the MAE of the red chromaticity component of each pixel in the n×n pixel block in the source frame and the MAE of the red chromaticity component of each pixel in the n×n pixel block in the reference frame are calculated and then, according to the larger MAE among the MAEs corresponding to the source frame and the reference frame, an initial value of the red chromaticity component is obtained and regarded as the threshold value of the red chromaticity component.

As for each of the pixel positions belonging to the edge, the present embodiment respectively executes steps S140 and S150 according to each specific color component of the pixel position. For instance, the brightness component, the blue chromaticity component and the red chromaticity component are respectively determined. By executing the steps S140 and S150, the reference frame of which the brightness and the color on the pixel position are different from those of the source frame on the same pixel position can be eliminated. On the other words, the brightness and the color of the selected qualified reference frames on the pixel position are similar to those of the source frame on the same pixel position and both of the qualified reference frames and the source frame have similar regional characteristics.

As shown in step S160, according to the edge sharpness corresponding to the pixel position within each of the source frame and the qualified reference frames, a first type color space component (such as the brightness component) of the pixel position in an all-in-focus image is determined.

Since the image details reflect on the brightness component of each pixel, the Laplacian mask (as shown in FIG. 5) is applied in the present embodiment to make a calculation of the brightness component of each pixel within a region including the pixel position to obtain the edge sharpness corresponding to the pixel position within each of the source frame and the qualified reference frames. That is, the brightness contrast of the pixel position with the periphery thereof is calculated. Then, among the source frame and the qualified reference frames, m frames each with a relatively high edge sharpness are obtained and an average weight value of the brightness component of the pixel position within each of the aforementioned m frames is calculated to be the first type color space component of the pixel position in the all-in-focus image.

As shown in step S170, according to a color brightness corresponding to the pixel position within each of the source frame and the qualified reference frames, a second type color space component (such as the chromaticity component) of the pixel position in the all-in-focus image is determined. In the present embodiment, it is determined whether the chromaticity component of the pixel position within each of the source frame and the qualified reference frames is all close to a neutral color according to the following equation:

$$\sum_{s=1}^{T}(\text{abs}(Cb_S - 128) + \text{abs}(Cr_S - 128)) < CTH$$

Wherein, T represents the total number of the source frame and the qualified reference frames. $Cb_S$ represents a blue chromaticity component of the pixel position in one frame and $Cr_S$ represents a red chromaticity component of the pixel position in one frame. CTH is the threshold value of the color brightness and the value of CTH is related to the sensitivity of the image capturing device. For instance, when the sensitivity is high, the threshold value of the corresponding color brightness is large. When the sensitivity is low, the threshold value of the corresponding color brightness is small.

Figure 6:
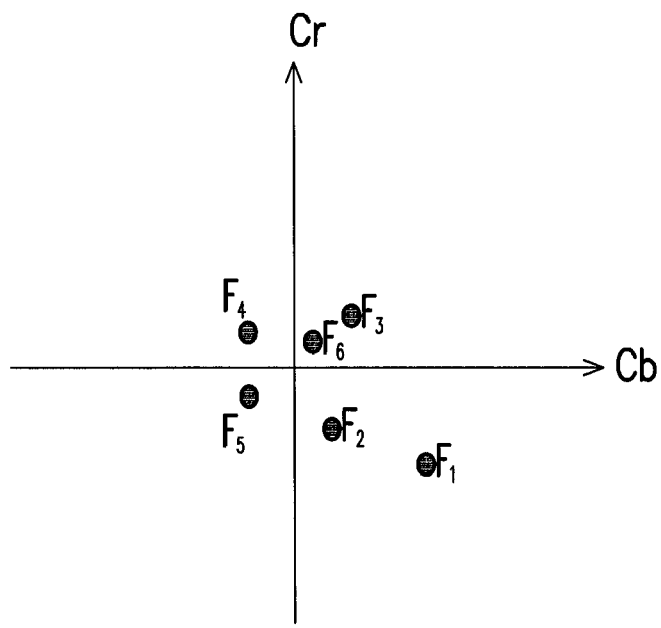
FIG. 6 and FIG. 7 are coordinate systems of blue chromaticity components and red chromaticity components according to one embodiment of the present invention.

If the aforementioned equation is proved to be true, it means that the chromaticity component of the pixel position within each of the source frame and the qualified reference frames is all close to the neutral color. Accordingly, the weight value respectively corresponding to each of the source frame and the qualified reference frames is determined according to the first rule. The first rule is that the frame with the chromaticity component of the pixel position therein more close to the neutral color is given with relatively large weight value. FIG. 6 is coordinate system of blue chromaticity components and red chromaticity components according to one embodiment of the present invention. The coordinate axis Cb represents blue chromaticity component and the coordinate axis Cr represents red chromaticity component. Each of the blue chromaticity component and the red chromaticity component at the origin of the coordinates is 128 (which represents the neutral color). As shown in FIG. 6, the coordinates F1 through F6 represent six frames respectively. Since all of the six coordinates are close to the origin of the coordinates, these frames are given the frame weight value according to the first rule. The frame corresponding to the coordinate F6 is given the highest weight value.

Figure 7:
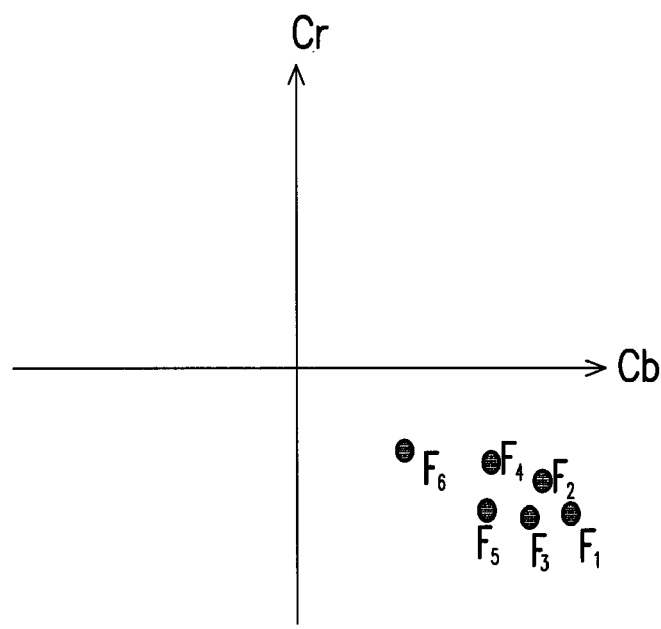

If the aforementioned condition is proved to be untrue, it means that the chromaticity component of the pixel position of each of the source frame and the qualified reference frames is not all close to the neutral color. Accordingly, the weight value respectively corresponding to each of the source frame and the qualified reference frames is determined according to the second rule. The second rule is that the frame with the chromaticity component of the pixel position therein more far from the neutral color is given with relatively large weight value. FIG. 7 is coordinate system of blue chromaticity components and red chromaticity components according to one embodiment of the present invention. The coordinate axis Cb represents blue chromaticity component and the coordinate axis Cr represents red chromaticity component. Each of the blue chromaticity component and the red chromaticity component at the origin of the coordinates is 128 (which represents the neutral color). As shown in FIG. 7, the coordinates F1 through F6 representing six frames respectively belong to the same quadrant and is not all close to the origin of the coordinates. Thus, the frames are given the frame weight value according to the second rule. The frame corresponding to the coordinate F1 which is farthest coordinate from the origin of the coordinates is given the highest weight value.

Moreover, according to the weight values corresponding to the source frame and the qualified reference frames, the average weight value of the chromaticity component of the pixel position within each of the source frame and the qualified reference frames is calculated to be the second type color space component of the pixel position in the all-in-focus image.

As for all of the pixel positions belonging to the edge, the brightness component and the chromaticity component of the pixel position in the all-in-focus image is generated by using the method shown in the steps S140 through S170. Accordingly, the congruence result on the pixel positions belonging to the edge is in extremely clear focus (that is, the contrast of the brightness component is more obvious). Further, the problem of lightening color in the composite image can be solved by using the aforementioned method.

Besides, as for each of the pixel positions not belonging to the edge, steps S180 through S190 are performed. In the step S180, the brightness component of the pixel position in the source frame is used as the first type color space component (such as the brightness component) of the pixel position in the all-in-focus image, and, as shown in the step S190, the chromaticity component of the pixel position in the source frame is used as the second type color space component (such as the chromaticity component) of the pixel position in the all-in-focus image. As shown in steps S180 and S190, by using replacement method instead of congruence method, the brightness component and the chromaticity component of the pixel position not belonging to the edge in the all-in-focus image are determined to avoid the increment of the noises of the planar region.

In the present embodiment, while the all-in-focus image is generated by using several frames, for the pixel positions belonging to the edge, the characteristic similarity between the pixel position in the source frame and the corresponding pixel position in each of the reference frames is used to determine which of the reference frames are selected to be used in the congruence. After some of the reference frames are selected for the congruence, the way to perform the congruence is determined according to the edge sharpness and the color brightness so as to obtain a relatively better congruence result. As for each of the pixel positions not belonging to the edge, the brightness component and the chromaticity component of the pixel position in the source frame are used as the brightness component and the chromaticity component of the pixel position in the all-in-focus image. Different processing methods applied on the pixel positions according to whether each of the pixel positions belongs to the edge can avoid the increment of the noises of the planar region due to insistently performing the congruence without regarding any possible consequence.

Altogether, in the present invention, the method for generating an all-in-focus image uses several frames captured at different focal lengths to generate an all-in-focus image of which every portion is in clear focus. While the all-in-focus image is generated, the noises in the image are eliminated at the same time. Meanwhile, the color of the all-in-focus image is ensured to be still vibrant and the details in the image are ensured to be well preserved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for generating an all-in-focus image, for an image capturing device, the method comprising:

obtaining a plurality of frames captured at a plurality of focal lengths, wherein the frames comprise a source frame and a plurality of reference frames;

performing a motion compensation procedure on the frames;

performing an edge detection procedure on the frames to determine whether each of pixel positions in the frames belongs to an edge; and for each of the pixel positions belonging to the edge, performing the steps of:

calculating a characteristic similarity between the pixel position within the source frame and the pixel position within each of the reference frames;

according to the characteristic similarities respectively corresponding to the reference frames, selecting a plurality of qualified reference frames among the reference frames;

according to an edge sharpness corresponding to the pixel position within each of the source frame and the qualified reference frames, determining a first type color space component of the pixel position within an all-in-focus image; and according to a color brightness corresponding to the pixel position within each of the source frame and the qualified reference frames, determining a second type color space component of the pixel position within the all-in-focus image.

2. The method of claim 1, wherein a number of the frames captured at each of the focal lengths is larger than one.

3. The method of claim 1, wherein the step of calculating the characteristic similarity between the pixel position within the source frame and the pixel position within each of the reference frames comprises:
   in the source frame, obtaining an n×n pixel block with the pixel position as a center, wherein n is a positive integer; and
   for each of the reference frames, performing the steps of:
      obtaining the n×n pixel block with the pixel position as a center; and
      calculating a sum of absolute difference (SAD) of a specific color space component of each of pixels in the n×n pixel block of the source frame and the reference frame to be the characteristic similarity between the pixel position in the source frame and the pixel position in the reference frame.

4. The method of claim 3, wherein the specific color space component comprises one of a brightness component, a blue chromaticity component and a red chromaticity component.

5. The method of claim 3, wherein the step of selecting the qualified reference frames among the reference frames according to the characteristic similarities respectively corresponding to the reference frames comprises:
   for each of the reference frames, detecting whether the pixel position within the reference frame has impulse noises;
   when there is no impulse noise, obtaining a threshold value of the specific color space component and determining whether the characteristic similarity between the pixel position in the source frame and the pixel position in the reference frame is smaller than the threshold value of the specific color space component; and
   when the characteristic similarity is smaller than the threshold value of the specific color space component, selecting the reference frame as the qualified reference frame.

6. The method of claim 5, wherein the step of obtaining the threshold value of the specific color space component comprises:
   calculating a mean absolute error (MAE) of the specific color space component of each of the pixels within the n×n pixel block in the source frame;
   calculating the MAE of the specific color space component of each of the pixels within the n×n pixel block in the reference frame;
   comparing the MAE corresponding to the source frame with the MAE corresponding to the reference frame;
   obtaining an initial value of the specific color space component according to one larger MAE among the MAE corresponding to the source frame and the MAE corresponding to the reference frame;
   obtaining a specific color space component gain according to the specific color space component of the pixel position within the source frame; and
   regarding a product of the initial value of the specific color space component and the specific color space component gain as the threshold value of the specific color space component.

7. The method of claim 1, wherein the step of determining the first type color space component of the pixel position within the all-in-focus image according to the edge sharpness corresponding to the pixel position within each of the source frame and the qualified reference frames comprises:
   applying a Laplacian mask to calculate the edge sharpness corresponding to the pixel position within each of the source frame and the qualified reference frames;
   obtaining m frames each corresponding to larger edge sharpness among the source frame and the reference frames; and
   calculating an average weight value of a brightness component of the pixel position of each of m frames to be the first type color space component.

8. The method of claim 1, wherein the step of determining the second type color space component of the pixel position within the all-in-focus image according to the color brightness corresponding to the pixel position within each of the source frame and the qualified reference frames comprises:
   determining whether a chromaticity component of the pixel position within each of the source frame and the qualified reference frames is all close to a neutral color;
   when the chromaticity component of the pixel position within each of the source frame and the qualified reference frames is all close to the neutral color, determining a weight value corresponding to each of the source frame and the qualified reference frames according to a first rule;
   when the chromaticity component of the pixel position within each of the source frame and the qualified reference frames is not all close to the neutral color, determining the weight value corresponding to each of the source frame and the qualified reference frames according to a second rule; and
   according to the weight value corresponding to each of the source frame and the qualified reference frames, calculating an average weight value of the chromaticity component of the pixel position within each of the source frame and the qualified reference frames to be the second type color space component.

9. The method of claim 8, wherein the first rule is that the frame of which the chromaticity component of the pixel position therein is closer to the neutral color is given a relatively large weight value and the second rule is that the frame of which the chromaticity component of the pixel position therein is more far from the neutral color is given a relatively large weight value.

10. The method of claim 1, after the step of determining whether each of the pixel positions in each of the frames belongs to the edge, further comprising:
   for each of the pixel positions not belonging to the edge, performing the steps of:
      using a brightness component of the pixel position in the source frame as the first type color space component of the pixel position within the all-in-focus image; and
      using the chromaticity component of the pixel position in the source frame as the second type color space component of the pixel position within the all-in-focus image.

* * * * *